United States Patent
Tummidi et al.

(10) Patent No.: US 9,164,235 B1
(45) Date of Patent: Oct. 20, 2015

(54) DUAL TIP OPTICAL COUPLER

(71) Applicant: Cisco Technology, Inc., San Jose, CA (US)

(72) Inventors: Ravi Sekhar Tummidi, Breinigsville, PA (US); David Piede, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/322,661

(22) Filed: Jul. 2, 2014

(51) Int. Cl.
*G02B 6/43* (2006.01)
*G02B 6/26* (2006.01)
*G02B 6/42* (2006.01)
*G02B 6/12* (2006.01)

(52) U.S. Cl.
CPC .............. *G02B 6/26* (2013.01); *G02B 6/12004* (2013.01); *G02B 6/4214* (2013.01); *G02B 6/43* (2013.01)

(58) Field of Classification Search
CPC ..... G02B 6/43; G02B 6/4214; G02B 6/12004
USPC .......................................................... 385/14
See application file for complete search history.

(56) References Cited

U.S. PATENT DOCUMENTS

| | | | |
|---|---|---|---|
| 6,934,444 B2 | 8/2005 | Ghiron et al. | |
| 7,013,067 B2 * | 3/2006 | Ghiron et al. | 385/39 |
| 7,415,184 B2 | 8/2008 | Ghiron et al. | |
| 8,121,450 B2 * | 2/2012 | Webster et al. | 385/38 |
| 2014/0174149 A1 * | 6/2014 | Wicks et al. | 73/1.79 |

OTHER PUBLICATIONS

Almeida, Vilson et al., Nanotaper for compact mode conversion, Optics letters, vol. 28, No. 15, Aug. 1, 2003, Optical Society of America, Washington, D.C., United States.
Doylend, J. K. et al., Design and Simulation of an Integrated Fiber-to-Chip Coupler for Silicon-on-Insulator Waveguides, Selected Topics in Quantum Electronics, vol. 12, Issue: 6 , pp. 1363-1370, IEEE, Piscataway, United States.
VermeulenD. et al., High-efficiency fiberto-chip grating couplers realized using an advanced CMOS-compatible Silicon-On-Insulator platform, Optics Express, vol. 18, Issue 17, pp. 18278-18283, Optics Express, Washington, D.C., United States.
Hatori, Nobuaki et al., A Novel Spot Size Convertor for Hybrid Integrated Light Sources on Photonics-Electronics Convergence System. Group Four Photinics Conference, Paper ThB2, 2012, IEEE, Piscataway, United States.

(Continued)

*Primary Examiner* — Akm Enayet Ullah
(74) *Attorney, Agent, or Firm* — Patterson & Sheridan LLP

(57) ABSTRACT

Embodiments disclosed herein generally relate to optical couplers for transmitting an optical signal between a waveguide in an optical device to an external light-carrying medium and vice versa. The couplers include first and second portions that extend away from the waveguide towards an optical interface that faces the light-carrying medium. The first portion is attached to the waveguide, while the second portion is not. In one example, a first end of the first portion is attached to the waveguide, while a second end, opposite the first end, faces the optical interface. The first portion may taper as it extends from the first end to the second. The second portion of the coupler may be physically separated from both the first portion and the waveguide. However, in one embodiment, the first and second portions extend in the same direction towards the optical interface.

20 Claims, 12 Drawing Sheets

(56) References Cited

OTHER PUBLICATIONS

Tao, S.H. et al., Improving coupling efficiency of fiber-waveguide coupling with double-tip coupler, Optical Society of America, Dec. 2008, vol. 16, No. 25, OSA, Washington, D.C., United States.

Alder, T. et al., High-Efficiency Fiber-to-Chip Coupling Using Low-Loss Tapered Single-Mode Fiber, IEEE Photonics Technology Letters,vol. 12 , Issue 8 , Aug. 2000, IEEE Piscataway, United States.

Halir, R. et al., Continuously apodized fiber-to-chip surface grating coupler with refractice index engineered subwavelength structure, Optics Letters, vol. 35, No. 19, Oct. 2010, Optical Society of America, Washington, D.C., United States.

Hauffe, R., et al., Methods for Passive Fiber Chip Coupling of Integrated Optical Devices, Electronic Components and Technology Conference, 2000, IEEE, Piscataway, United States.

Khilo, Anatol et al., Efficient planar fiber-to-chip coupler based on two-stage adiabatic evolution, Optics Express, vol. 18, Issue 15, pp. 15790-15806, 2010, Optical Society of America, Washington, D.C., United States.

Sun, Rong et al.,High performance asymmetric graded index coupler with integrated lens for high index waveguides, Applied Physics Letters, 2007, vol. 90, Issue: 20, pp. 201116-201116-3, American Institute of Physics, Melville, United States.

\* cited by examiner

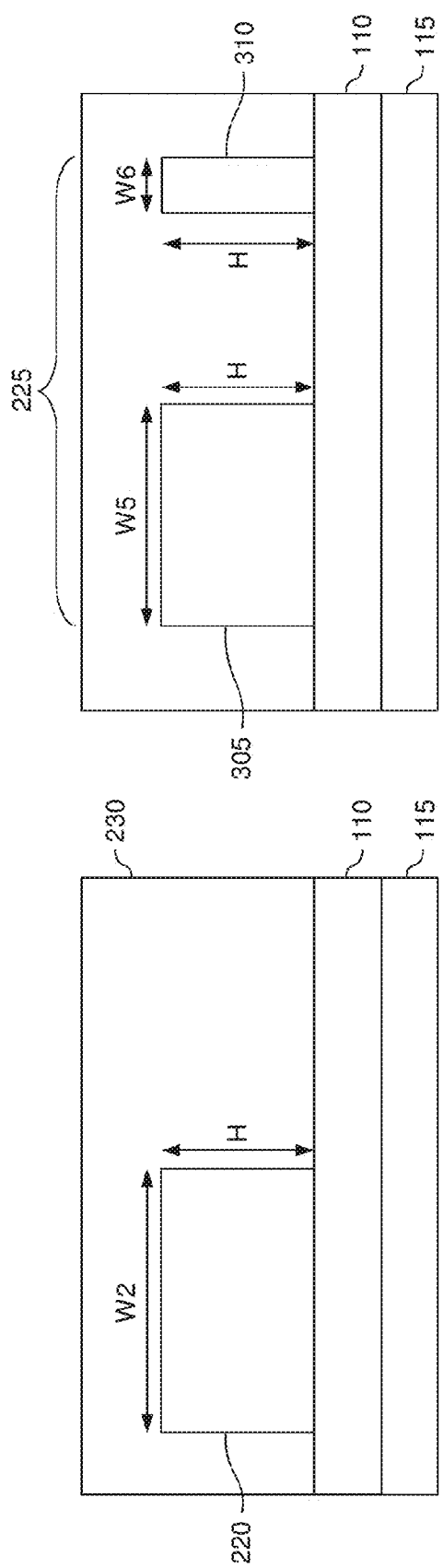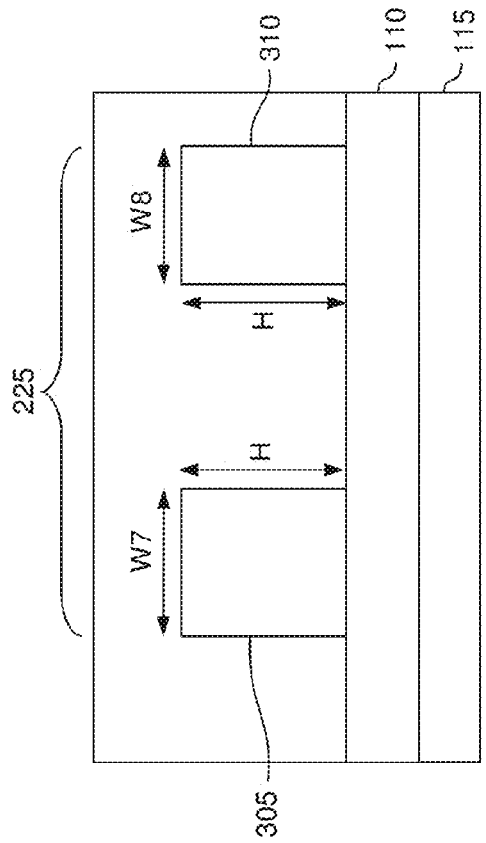

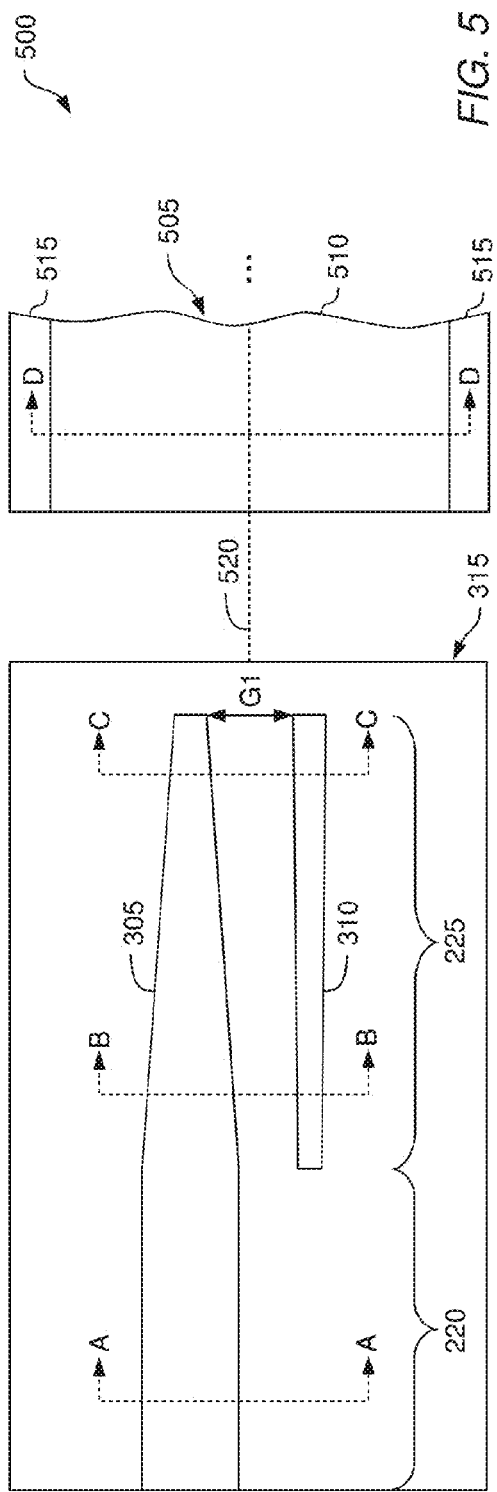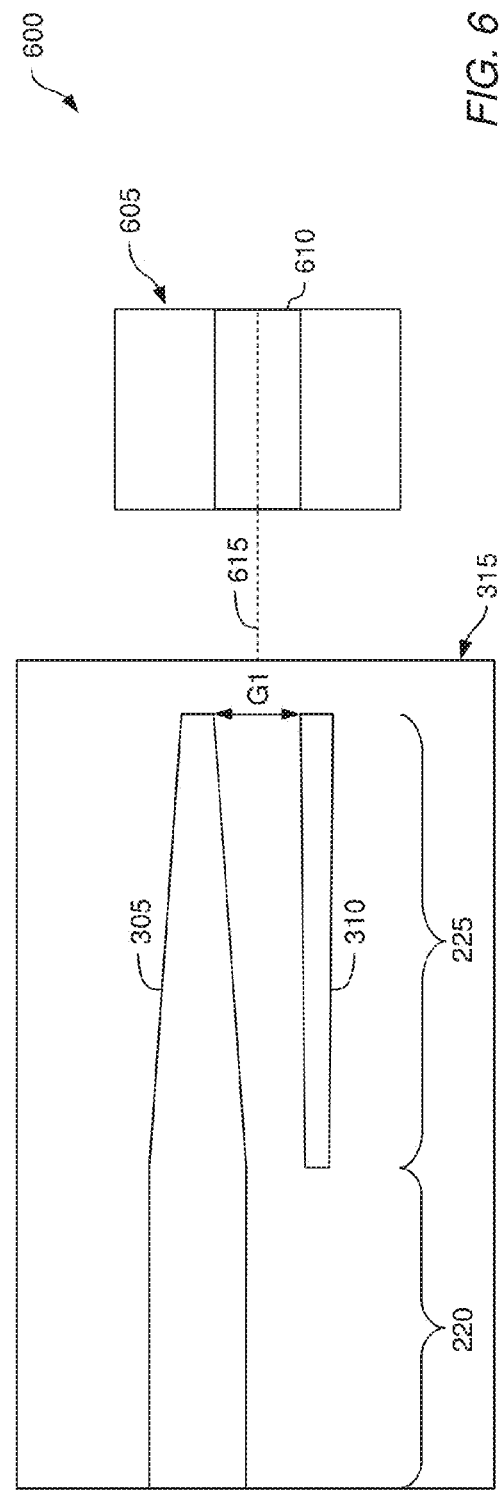

DUAL TIP OPTICAL COUPLER

TECHNICAL FIELD

Embodiments presented herein generally relate to waveguides in an optical device, and more specifically, to an optical coupler in an optical device for coupling a waveguide to an external light-carrying medium.

BACKGROUND

Silicon-on-Insulator (SOI) optical devices may include an active surface layer that includes waveguides, optical modulators, detectors, CMOS circuitry, metal leads for interfacing with external semiconductor chips, and the like. Transmitting optical signals from and to this active surface layer introduces many challenges. For example, a fiber optic cable may be attached to the SOI optical device and interface with a waveguide on its surface layer. However, the mode field diameter of the one or more modes of the optic cable (e.g., approximately 10 microns for a single-mode cable) may have a much different size than the mode of a sub-micron dimensioned waveguide tasked with routing the optical signal in the SOI device. Accordingly, directly interfacing the fiber optic cable with the sub-micron waveguide may result in low transmission efficiency or high coupling loss (e.g., less than 1% coupling efficiency).

In some optical devices, lenses are used to focus the light from an external fiber optic cable or a laser source into the waveguides, thereby shrinking the mode or adjusting the numerical aperture such that the optical signal can be efficiently transferred into the sub-micron waveguides. However, using lenses increases the cost and complexity of the optical device. Moreover, the lenses need to be aligned to ensure the signal from the light-carrying medium focuses onto the waveguide. As such, not only do the lenses add cost to an optical system, but coupling efficiency suffers if the lenses are not aligned correctly.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4C illustrate cross sectional views of the structure in FIG. 3, according to embodiments disclosed herein.

FIG. 5 illustrates an optical system with an optical fiber aligned with the optical coupler, according to one embodiment disclosed herein.

FIG. 6 illustrates an optical system with a laser aligned with the optical coupler, according to one embodiment disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
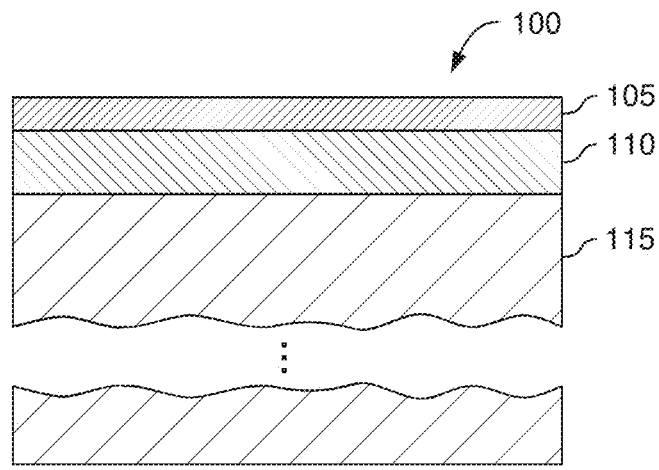
FIG. 1 generally illustrates a SOI device, according to one embodiment disclosed herein.

One embodiment presented in this disclosure is an optical device that includes an optical interface, a waveguide, and an optical coupler coupled to the waveguide and is configured to at least transmit and/or receive an optical signal across the optical interface. The optical coupler includes a first portion comprising a first end attached to the waveguide and a second end, opposite the first end, facing the optical interface and a second portion extending in a direction away from the waveguide and towards the optical interface. The second portion includes a third end facing the optical interface, and the second portion is separated by a gap from both the first portion and the waveguide. Furthermore, the second end of the first portion is offset a first distance from the optical interface and the third end of the second portion is offset a second distance from the optical interface, wherein the first and second distances differ by at most 1 micron.

Another embodiment presented herein is an optical system that includes a light-carrying medium and an optical device aligned with the light-carrying medium at an optical interface. The optical device includes a waveguide and an optical coupler. The optical coupler includes a first portion having a first end attached to the waveguide and a second end, opposite the first end, facing the optical interface and a second portion extending in a direction away from the waveguide and towards the optical interface, where the entire second portion is separated by a gap from both the first portion and the waveguide. Moreover, a center axis of the light-carrying medium intersects a region between the first and second portions.

Another embodiment presented herein is an optical device including an optical interface and a waveguide connected to an optical component at a first end. The optical device also includes an optical coupler connected to a second end of the waveguide and is configured to transmit and/or receive an optical signal across the optical interface. The optical coupler includes a first portion comprising a third end attached to the second end of the waveguide and a fourth end, opposite the third end, facing the optical interface. Moreover, a width of the first portion tapers as the first portion extends from the third end to the fourth end. The optical coupler also includes a second portion extending in a direction away from the waveguide and towards the optical interface, where the second portion is separated from both the first portion and the waveguide.

EXAMPLE EMBODIMENTS

An optical device may include an optical coupler that couples an external light-carrying medium—e.g., a fiber optic cable or a signal generator such as a laser—to a waveguide embedded within the optical device. In one embodiment, the optical signal emitted from the light-carrying medium enters the coupler which adiabatically transforms the mode to better match the mode of the waveguide. Using the coupler may improve transmission efficiency relative to directly coupling (e.g., butt-coupling) the light-carrying medium to the waveguide. Specifically, the coupler may enable the light-carrying medium to transmit the optical signal directly into, or receive the optical signal directly from, the optical device without the use of any external lenses, even if the waveguide is a sub-micron waveguide.

In one embodiment, the optical coupler includes a first portion and a second portion that extend away from the waveguide towards an optical interface that faces the external light-carrying medium. The first portion is attached to the silicon waveguide, while the second portion is not. In one example, a first end of the first portion is attached to the waveguide while a second end, opposite the first end, faces the optical interface. The first portion may taper (i.e., the width of the first portion decreases) as it extends from the first end to the second end. The second portion of the coupler may be physically separated from (i.e., does not directly couple to) both the first portion and the waveguide. In one embodiment, a center axis of the first portion and a center axis of the second portion are parallel and extend in the same direction towards the optical interface.

To minimize the effect of back reflections when light is transmitted from the external light-carrying medium into the waveguide coupler, in one embodiment, the first and second portions may be recessed different lengths from the optical interface. For example, the end of the first portion that faces the optical interface may be closer (or farther away) from the optical interface than the end of the second portion that also faces the optical interface. Offsetting the first and second portions in this manner increases the difference between the back reflected and the mode of the optical signal received at the optical interface, thereby minimizing the effect of the back reflections on the external light-carrying medium (e.g., a laser).

FIG. 1 generally illustrates a (silicon-on-insulator) SOI device 100, according to one embodiment disclosed herein. SOI device 100 includes a surface layer 105, a buried insulation layer 110 (also referred to as buried oxide (BOX) layer), and a semiconductor substrate 115. Although the embodiments herein refer to the surface layer 105 and substrate 115 as silicon, the disclosure is not limited to such material. For example, other semiconductors or optically transmissive materials may be used to form the structure 100 shown here. Moreover, the surface 105 and the substrate 115 may be made of the same material or can be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. In one embodiment, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and/or mounted on another substrate.

For optical applications, the silicon surface layer 105 and insulation layer 110 (e.g., silicon dioxide, silicon oxynitride, and the like) may provide contrasting refractive indexes that confine an optical signal in a silicon waveguide in the surface layer 105. In a later processing step, the surface layer 105 of the SOI device 100 may be etched or patterned to form one or more silicon waveguides. Because silicon has a higher refractive index compared to an insulator such as silicon dioxide, the optical signal remains primarily in the waveguide as it propagates across the surface layer 105.

Figure 2:
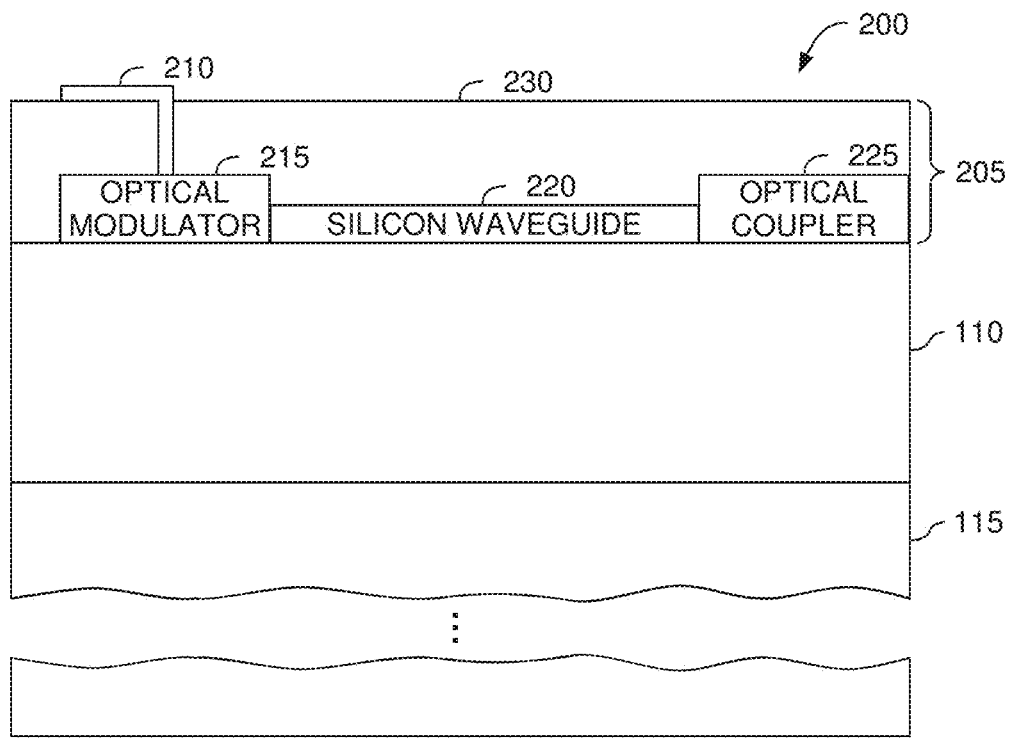
FIG. 2 illustrates a SOI device with an optical coupler, according to one embodiment disclosed herein.

FIG. 2 illustrates an SOI device 200, or more specifically, an optical device with an optical coupler 225, according to one embodiment disclosed herein. Like the SOI device 100 in FIG. 1, SOI device 200 includes a top surface layer 205, insulation layer 110, and substrate 115. However, the surface layer 205 is shown to include various optical components that have been formed therein and may be used in an optical device. For example, surface layer 205 includes an optical modulator 215 with a conductive lead 210. The modulator 215 may be formed by performing various fabrication steps on the silicon layer such as etching or doping the silicon material as well as depositing additional materials into or onto the surface layer 205. Conductive lead 210 may be used to transmit a data signal that controls the optical modulator 215. For example, the optical modulator 215 may be a CMOS capacitor including n-type and p-type doped regions coupled to respective conductive leads for changing the phase of the optical signal passing through the modulator 215. Although not shown, the conductive lead 210 may be connected to an integrated circuit mounted on the SOI device 200 that provides one or more data signals that control the modulator 215. In another embodiment, the integrated circuit may be physically separate from the SOI device 200, but coupled to the conductive lead 210 via a bond wire.

Like optical modulator 215, the silicon waveguide 220 may be fabricated from a silicon surface layer (e.g., layer 105 of FIG. 1). SOI device 200 may use waveguide 220 to carry an optical signal to different areas of the surface layer 205. For example, an input of optical modulator 215 may receive the optical signal via waveguide 220, modulate the signal, and transmit the resulting signal along a different waveguide coupled to an output of the optical modulator 215.

In addition to including components made from silicon, surface layer 205 may include other components (not shown) which may be made from other materials or a combination of silicon with other materials (e.g., a geranium detector). The other materials may be deposited into or on surface layer 205 using any suitable deposition techniques. Once the surface layer 205 is processed to include the desired components, the components may be covered with a protective material 230 (e.g., an electrical insulative material) which may serve as a suitable base for mounting additional circuitry on the SOI device 200. In this manner, the silicon surface layer 205 of SOI device 200 may be processed using any number of techniques to form a device for performing a particular application such as optical modulation, detection, amplification, generating an optical signal, and the like.

Surface layer 205 also includes the optical coupler 225 attached to the silicon waveguide 220. As shown, one end of the optical coupler 225 is coupled to the waveguide 220, while another end is proximate to an outer or external surface of the SOI device 200 referred to herein as the optical interface. Although the optical coupler 225 is shown as being exposed on the outer surface of the device 200, in other embodiments the optical coupler 225 may be recessed slightly from the outer surface (e.g., recessed less than 1-5 microns). In one embodiment, the optical coupler 225 may be made of the same material as the waveguide 220. For example, the coupler 225 and waveguide 220 may both be made of silicon.

The optical coupler 225 may be designed to efficiently couple to an external light-carrying medium. As explained above, because the dimensions of the silicon waveguide 220 may result in high optical losses if directly connected to an external light-carrying medium, the light-carrying medium may instead be coupled to the coupler 225 which then transfers the signal into the silicon waveguide 220. The optical coupler 225 may permit the external light-carrying medium to transmit light directly into, or receive light from, the SOI device 200 without the addition of external focusing elements.

Figure 3:
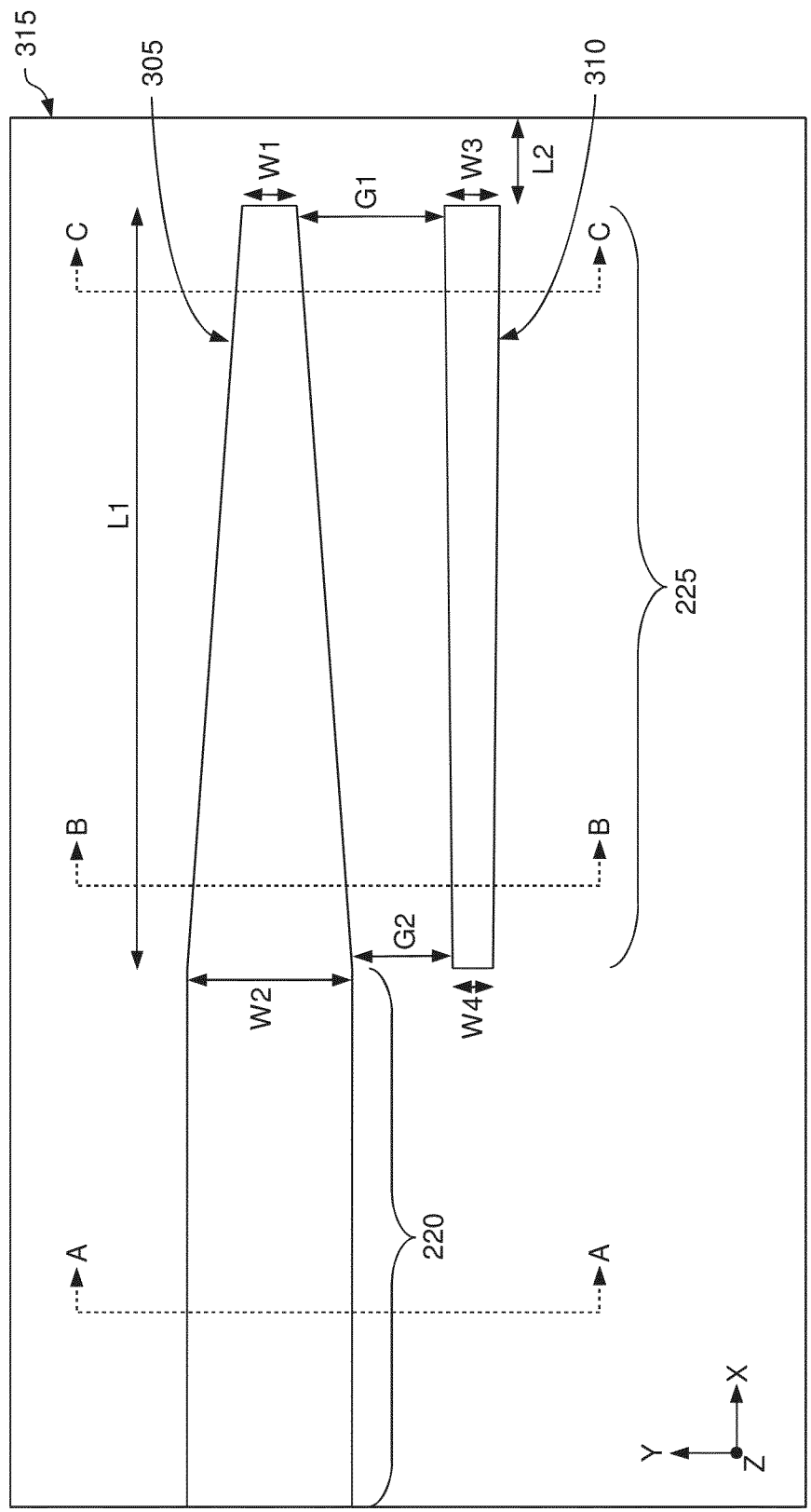
FIG. 3 illustrates a top view of a waveguide connected to an optical coupler, according to one embodiment disclosed herein.

FIG. 3 illustrates a top view of a waveguide with an optical coupler 225 according to one embodiment disclosed herein. The optical coupler 225 includes a first portion 305 and a second portion 310 that both extend away from the waveguide 220 toward an optical interface or boundary 315. Because the coupler 225 includes two portions that extend towards the interface 315, it may be referred to herein as a dual tip coupler.

In one embodiment, the first portion 305 extends from the waveguide 220 such that the width of the first portion 305 tapers as the first portion 305 approaches the optical interface 315. In one embodiment, the first portion 305 is contiguous with the silicon waveguide 220 to form a unitary structure. The first portion 305 and the waveguide 220 may be formed using the same process step or series of process steps or may be made using different steps. Moreover, the first portions 305 and the waveguide may form a unitary structure that includes the same material or different materials. Regardless, at the end of the first portion 305 that couples to the waveguide, the first portion 305 has a width (W2) that is greater than its width (W1) at the opposite end that faces the optical interface 315. Although FIG. 3 illustrates that both sides of the first portion 305 taper, in another embodiment, only one side of the first portion tapers while the opposite side remains parallel with a side of the waveguide 220. Additionally, the profile of the sides can be linear (as shown) or non-linear—e.g., a plurality discrete steps, exponential, etc.

Regardless of the profile of the sides, the physical dimensions of the first and second portions 305, 310, as well as the gaps G1 and G2, may be selected to ensure adiabaticity. In one embodiment, the width W2 may be the width of the silicon waveguide 220 (e.g., between 250 nm to 1 micron). More specifically, in one embodiment, the width W2 is between 400 nm-500 nm. At the other end of the first portion 305, the width W1 can be between 50 nm to 200 nm, and more specifically, between 100 nm-150 nm. The length L1 of the first and second portions 305, 310 is less than 200 microns. In one embodiment, it is preferred to make the length L1 as short as possible (e.g., L1 is less than 100 microns), but still maintain the optical signal in a single mode—i.e., the design of the first portion is based on adiabaticity. In one example, the widths and length of the first portion 305 are selected such that the slope of the taper ensures adiabatic behavior of the optical signal—i.e., the optical signal is maintained in a single mode as it traverses along the length of the first portion 305.

Unlike the first portion 305, the second portion 310 does not extend from the waveguide 220. More specifically, the second portion 310 is separated or spaced from the waveguide 220 such that the portion 310 is not contiguous with the waveguide 220. Additionally, the second portion 310 is separated from the first portion 305 by a gap (G1 and G2). The values of the gap G1 and G2 will vary based on the particular designs of the first and second portions 305, 310—e.g., the values G1 and G2 will vary based on the selected values for L1, W1, W2, W3, and W4. The gap is broadly defined as the region separating the second portion 310 from the first portion 305 and the waveguide 220. The distance between these components (i.e., the width of the gap) will vary depending on the particular design. Nonetheless, generally the value of G1 is greater than the value of G2 because of the relative tapers of the first portion 305 and the second portion 310. The values of G1 and G2 can range between 0.25 micron and 2 microns. In one embodiment, the gap between the first and second portions is filled with air or a dielectric material (e.g., the protective material 230 discussed in FIG. 2).

In one embodiment, the optical coupler 225 includes only the first and second portions 305, 310 that function as a single waveguide for interfacing the waveguide 220 with an external light-carrying medium. However, the embodiments described herein are not limited to such. In other embodiments, there may include other portions in the coupler 225 that also aid in adapting the optical mode to improve coupling efficiency.

In FIG. 3, the second portion 310 includes a slight taper where the width of the second portion 310 increases as the portion 310 extends towards the optical interface 315. As such, the width W3 is larger than the width W4. However, this is not a requirement. The second portion 310 can be designed with an inverse taper (i.e., W4 is greater than W3) or without any taper at all (i.e., W4 equals W3). Generally, the widths W3 and W4 range between 50 nm and 200 nm. For example, the width W3 may be 130 nm while width W4 is 100 nm. Moreover, in one embodiment, the width W3 is equal or approximately equal (within 10 nm) to width W1.

The widths W1, W2, W3, and W4 may be set based on the limitations of the processing techniques used to form the first and second portions 305, 310. For example, a particular processing technique may be unable to form the features of the first and second portions with widths less than 100 nm. As such, the widths may be adjusted accordingly. In one embodiment, the width W4 is selected to be smaller than width W2—e.g., W4 is 450 nm while W2 is 100 nm. Doing so may reduce back reflections for signals that propagate from the waveguide 220 onto the optical coupler 225.

In one embodiment, the center axes of the first portion 305 and the second portion 310 that extend in a direction towards the optical interface 315 are substantially parallel and perpendicular to the optical interface 315—i.e., the first and second portions 305, 310 extend in a common direction. Doing so aligns the coupler 225 with an external light-carrying medium that is also aligned to the optical interface 315 which is described in more detail below.

Although the optical coupler 225 includes two portions that are separated by a gap, these portions function as a single waveguide. Thus, the optical coupler 225 may be appropriately described as an extension of waveguide 220 although the second portion 310 is not attached to either waveguide 220 or the first portion 305.

As shown, the ends of the first and second portions 305, 310 facing the optical interface 315 are recessed from the interface 315 by the length L2. This space between the first and second portions 305, 310 and the optical interface 315 may be filled with dielectric material (e.g., silicon dioxide). Although this spacing is optional (i.e., the first and second portions 305, 310 can be exposed at the optical interface 315), the spacing may improve the optical efficiency by reducing the contrast of the index of refraction between air and the material of the optical coupler 225. For instance, air has a refractive index of approximately 1 while silicon (a suitable material for the first and second portions 305, 310) has a refractive index of approximately 3.42. By placing silicon dioxide, which has a refractive index of 1.44, between the silicon optical coupler 225 and the air at the optical interface 315, it reduces the change in the refractive indices at the interfaces that separate the different materials. In one embodiment, the length L2 may range from 0-6 microns.

FIGS. 4A-4C are cross sectional views of the structure in FIG. 3. Specifically, FIG. 4A is a cross section at the lines A-A in FIG. 3. Here, the cross section includes the waveguide 220 but not any part of the optical coupler. As shown, the waveguide 220 is disposed on the insulation layer 110 and semiconductor substrate 115. For example, the waveguide 220 may have been etched from a silicon layer disposed on the insulation layer 110 (e.g., silicon layer 105 shown in FIG. 1). Moreover, additional dielectric material 230, which may be same or different as the dielectric material of insulation layer 110, is shown encapsulating the waveguide 220. The width W2 of the waveguide 220 may be the same as discussed above—e.g., between 250 nm to 1 micron. The height H (e.g., thickness) of the waveguide 220 may range from 100 nm to 1 micron.

FIG. 4B is a cross section taken at B-B in FIG. 3. Because this cross sectional view is within the optical coupler 225, this view includes both the first portion 305 and the second portion 310. The width W5 of the first portion 305 may be slightly less than width W2 due to the taper of the optical coupler 225 along its length towards the optical interface. Conversely, the width W6 of the second portion 310 is slightly larger than width W4 since the second portion 310 flairs as it approaches the optical interface.

FIG. 4C is a cross section taken at C-C in FIG. 3 that is proximate to the terminal ends or tips of the first and second portions 305, 310. Here, the width W7 of the first portion 305 is less than the width W5 shown in FIG. 4B while the width W8 of the second portion 310 is greater than the width W6 in FIG. 4B. However, the height of the first and second portions 305, 310 may remain constant as the widths change, but this is not a requirement.

FIG. 5 illustrates an optical system 500 with an optical fiber 505 aligned with the optical coupler 225, according to one embodiment disclosed herein. As shown, the optical fiber includes a core 510 and cladding 515 for propagating an optical signal. The mode of an optical signal in the fiber may be around 9 microns, while the mode of the optical signal in the waveguide 220 may be less than 1 micron. In order to improve optical efficiency, the system 500 includes the optical coupler 225 for transforming the shape of the optical mode. For example, if an optical signal is transmitted from the optical fiber 505 to the waveguide 220, as the optical signal propagates through the optical coupler 225, the optical mode adiabatically transforms into the optical mode of the silicon waveguide 220, hence resulting in low coupling loss. The reverse is true when an optical signal is being transmitted from the waveguide 220 to the optical fiber 515.

To align the fiber 505 with the optical coupler 225, the system 500 may include a groove—e.g., a V or U shaped groove—for receiving the fiber 505. In one embodiment, the cladding 515 may be removed and the core is placed within the groove such that the core 510 and coupler 225 are aligned. Regardless of whether a groove is used to align the components, a center axis 520 of the fiber 505, or more specifically, a center axis 520 of the core 510 is aligned such that where the axis 520 intersects the optical interface 315 is between the tips of the first and second portions 305, 310 of the coupler 225.

As such, the center axis 520, when extended into the optical coupler 225, does not intersect either the tip of the first portion 305 or the tip of the second portion 310. Further still, in one embodiment, the center axis 520 intersects the middle of the gap G1 between the tips of the first and second portions 305, 310. As shown, the fiber 505 may be separated from the optical interface 315 by an air gap, but this is not a requirement. Furthermore, instead of an air gap, the gap may be filled with a dielectric material.

FIG. 6 illustrates an optical system 600 with a laser 605 aligned with the optical coupler 225, according to one embodiment disclosed herein. Here, the laser 605 is aligned with the optical interface 315 in order to transmit an optical signal into the waveguide 220. With many lasers 605, the diameter of the optical mode may be similar to the diameter of the optical mode in the waveguide 220. Thus, in these scenarios, the optical coupler 225 does not need to change the shape of the optical mode can be designed to accommodate the large numerical aperture (NA) of an optical signal generated using the laser 605. As such, the various dimensions of the optical coupler 225 (e.g., its widths and lengths shown in FIG. 3) may be different in optical system 600 than in optical system 500 where the coupler 225 is used to couple the waveguide 220 to an optical fiber. These precise dimensions will vary depending on the specific fiber and laser used.

Like in the optical system 500, the optical coupler 225 in optical system 600 is aligned with a center axis 615 such that the axis 615 is perpendicular with the optical interface 315 and lies between the tips of the first portion 305 and the second portion 310. In one embodiment, the center axis 615 intersects the middle of the gap G1 between the tips of the first and second portions 305, 310. In one embodiment, the center axis 615 is the center of a cavity 610 of the laser that is used to generate the optical signal. Moreover, the laser 615 may be separated from the optical interface 315 by a gap, but this is not a requirement.

Figure 7A:
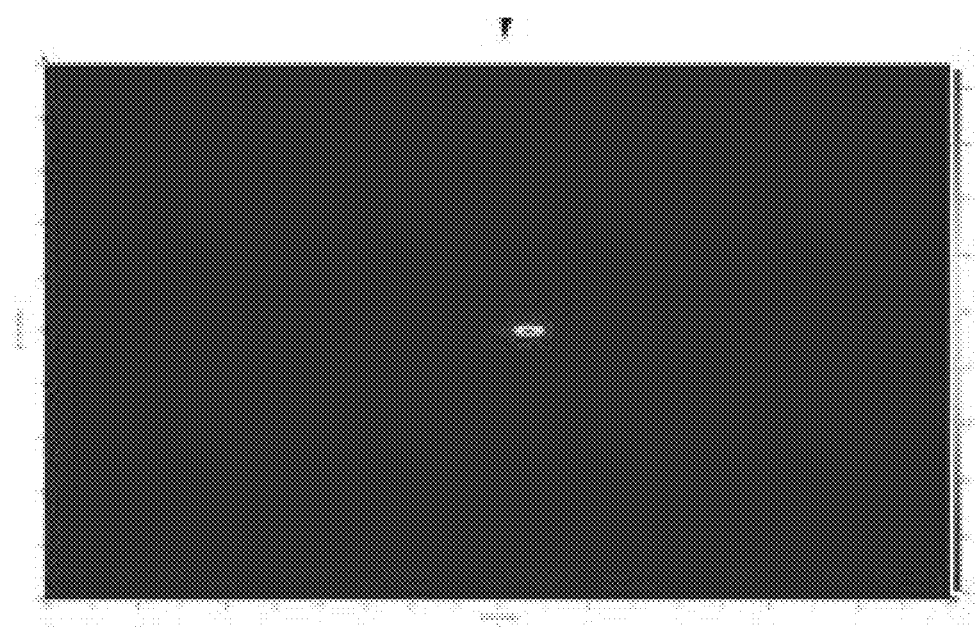
FIGS. 7A-7D illustrate the optical mode at various locations depicted in FIG. 5, according to embodiments disclosed herein.
Figure 7B:
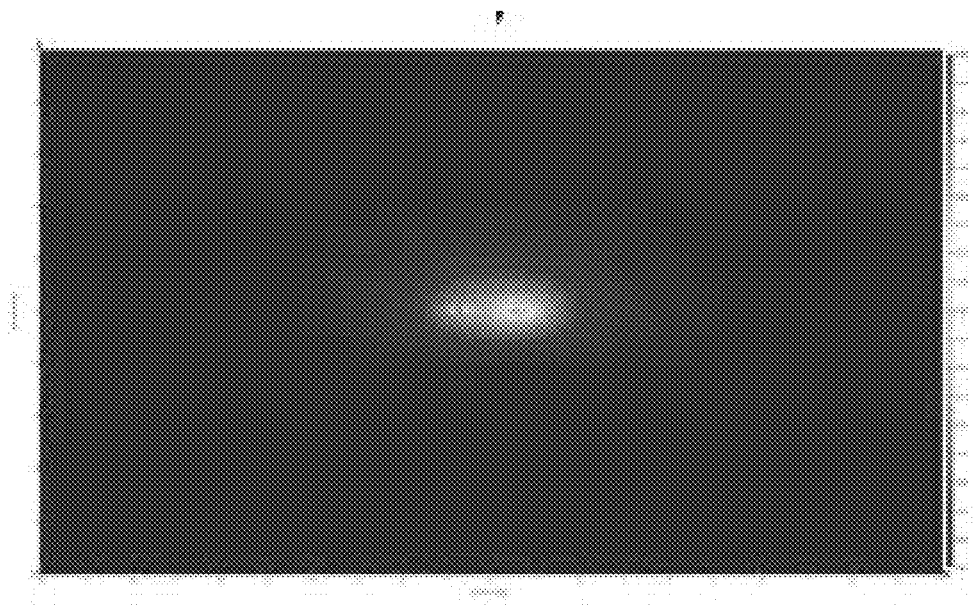

FIGS. 7A-7D illustrate the optical field at various locations in FIG. 5, according to embodiments disclosed herein. Specifically, FIG. 7A illustrates the optical field at the cross section A-A shown in FIG. 5 which includes the waveguide 220. As mentioned previously, the optical field is typically smaller than one micron in diameter when the signal is in the waveguide 220. FIG. 7B illustrates the shape of the optical field at the cross section B-B in FIG. 5. Here, the tapering of the first portion 305 forces a portion of the optical signal onto the second portion 310. As such, the optical mode begins to expand to include the second portion 310.

Figure 7C:
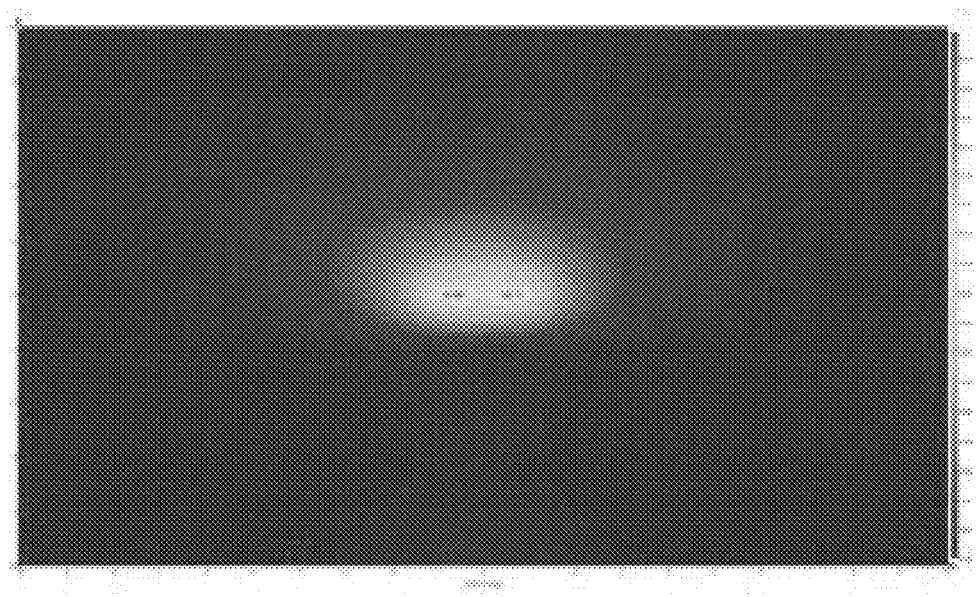
Figure 7D:
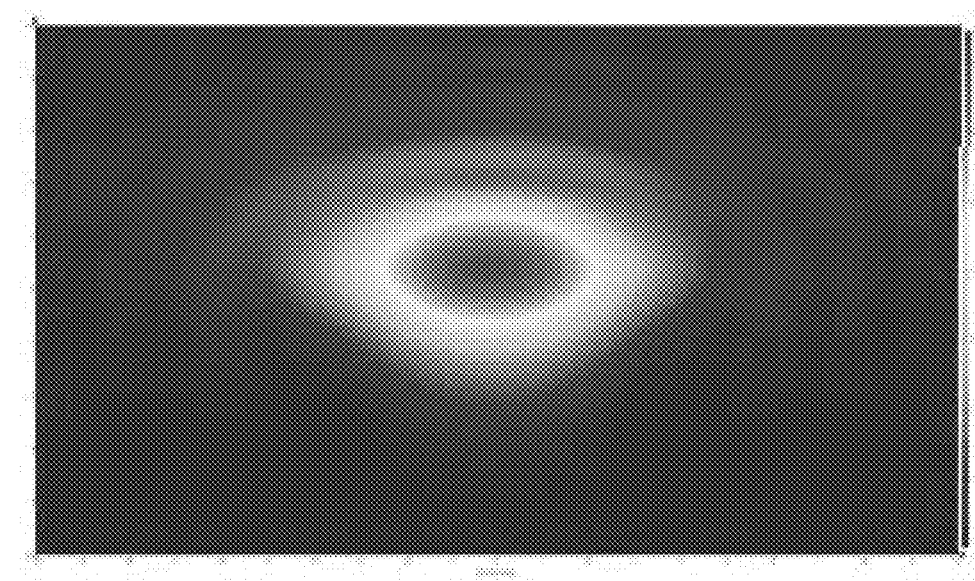

FIG. 7C illustrates the optical field at the cross section C-C shown in FIG. 5 near the end of the coupler 225 facing the optical interface 315. The structure of the first and second portions 305, 310 (e.g., the widths, length, and associated taper) transforms the optical field such that it is distributed around the first and second portions 305, 310. FIG. 7D illustrates the optical field at the cross section D-D in FIG. 5 along the core 510 of the optical fiber 505. When FIGS. 7A-7D are viewed in sequence, these figures illustrate transforming the optical mode in the waveguide 220 (FIG. 7A) such that it matches more closely the optical mode of the fiber (FIG. 7D). Conversely, when transmitting an optical signal from the fiber to the waveguide, the optical coupler transforms the optical mode into a shape more closely resembling the optical mode of a signal propagating in the waveguide 220.

Figure 8:
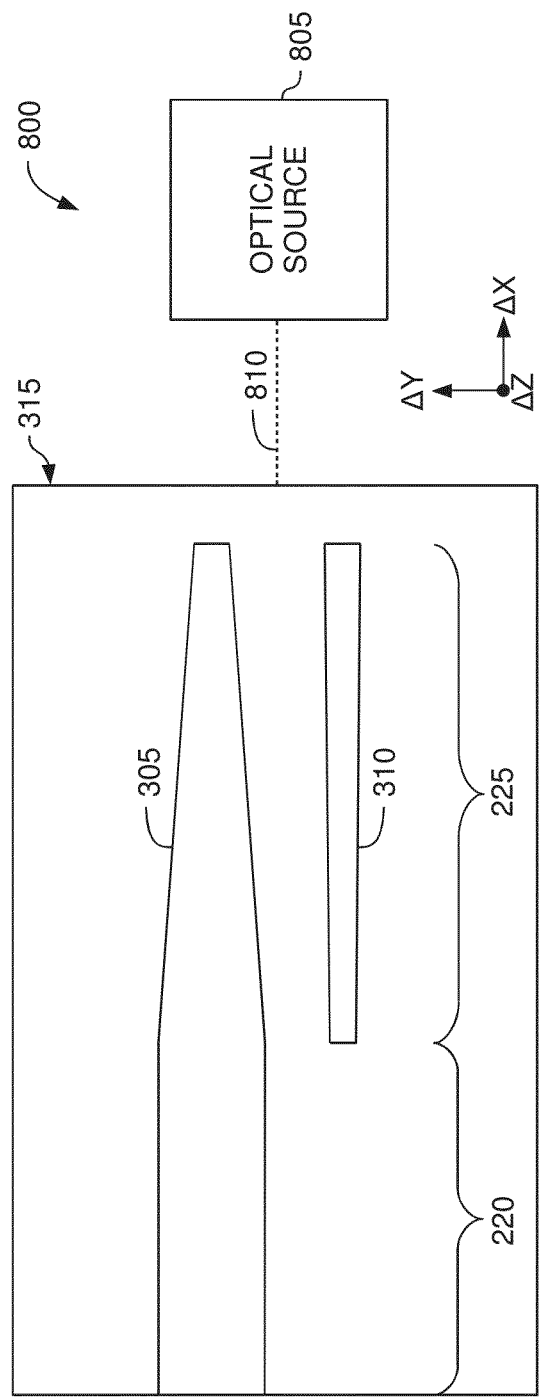
FIG. 8 illustrates an optical system with an aligned light source, according to one embodiment disclosed herein.

FIG. 8 illustrates an optical system 800 with an aligned optical source, according to one embodiment disclosed herein. The optical system 800 illustrates that the optical source 805 (e.g., a laser) is aligned with the optical coupler 225 along an alignment axis 810. For example, the alignment axis 810 may represent the alignment between the coupler 225 and the optical source 805 that is most preferred—i.e., where the coupling efficiency is the highest. If the alignment axis is moved in the x, y, or z direction, the coupling efficiency is reduced. The effect of such misalignment is shown in the charts in FIG. 9A-9D. In one embodiment, the optimal alignment in the y direction occurs when the peak of the signal from source 805 is between the two tips of the first and second portion. The optimal alignment in the z direction occurs when the peak of the signal from source 805 aligns with the middle of the tips. Although ideally there should be no gap between optical source 805 and the optical boundary 315, this is not possible for some optical systems, and thus a distance of 1.2 microns for the gap is assumed.

FIGS. 9A-9D illustrate the alignment tolerance of two different optical systems, according to one embodiment disclosed herein. Specifically, the charts in FIGS. 9A-9D compare the optical system 800 in FIG. 8 with a second optical system (not shown) that includes an optical coupler which only has the first portion 305, and not the second portion 310. Further still, in the second optical system, the optical source 805 is aligned directly with the first portion 305 such that a center axis of the first portion 305 is the center axis (or the alignment axis 810) of the optical source 805.

Figure 9A:
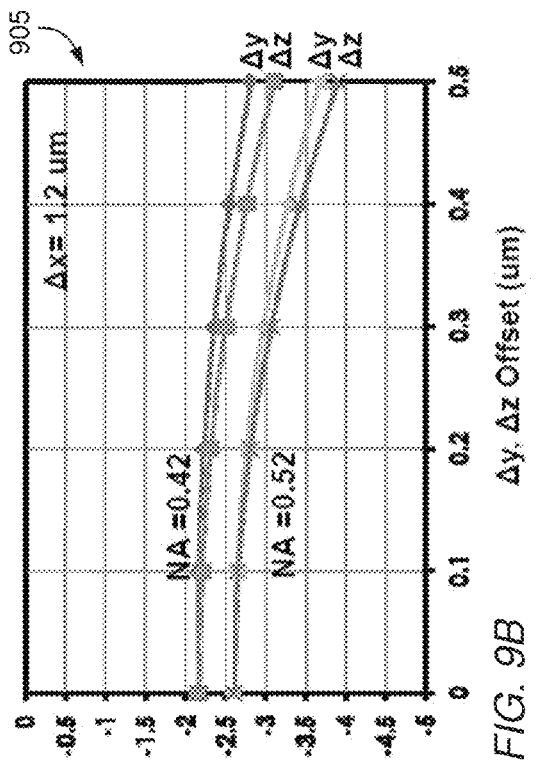
FIGS. 9A-9D illustrate the alignment tolerance of two different optical systems, according to one embodiment disclosed herein.

Chart 900 of FIG. 9A illustrates the effect of misalignment on the second optical system. Specifically, chart 900 illustrates the effect of moving either the optical coupler or the optical source in the z and y directions such that the respective center axes are no longer aligned on the alignment axis. Chart 900 provides data for two different types of optical source: an optical source with a 0.42 NA and an optical source with a 0.52 NA. For these sources, the optical efficiency decreases in the same manner. That is, the optical efficiency reduces in the same manner regardless of whether the offset is in the z direction or the y direction.

Figure 9B:
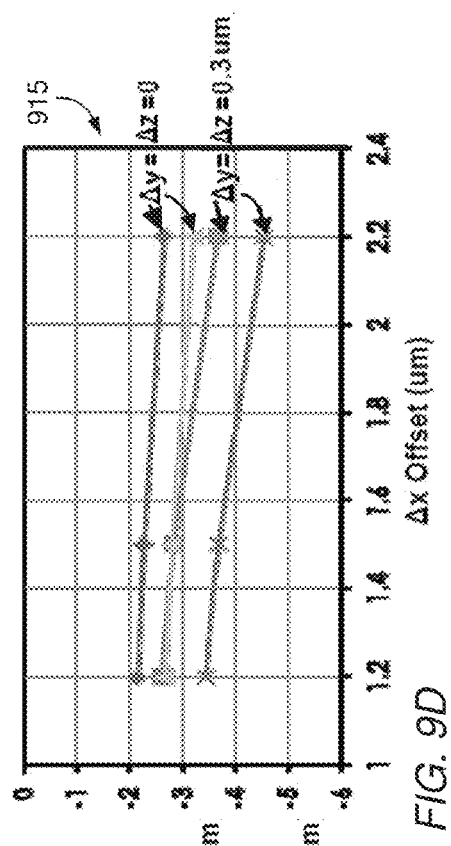

Chart 905 of FIG. 9B illustrates the effect of misalignment on the optical system 800 shown in FIG. 8. Chart 905 is similar to chart 900 in that the x direction is fixed as the two optical sources are moved away from the preferred alignment axis 810 in the y and z directions. Here, unlike in chart 900, the optical system 800 is more tolerant of misalignment in the y direction than in the z direction. Thus, everything else being equal, optical system 800 would be preferred over the second optical system since optical system 800 has greater tolerance for misalignment in the y direction. Furthermore, optical system 800 is preferred when a 0.52 NA light source is used since there is, in general, less coupling loss in the z direction even though the decrease in coupling efficiency in the z direction is similar for both optical systems—i.e., both optical systems have the same or similar alignment intolerance in the z direction.

Figure 9C:
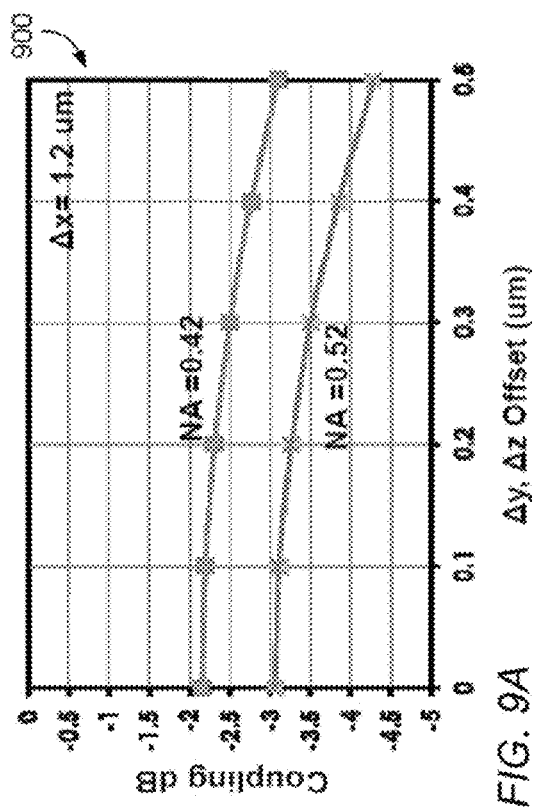

Chart 910 of FIG. 9C also illustrates the effect of misalignment on the second optical system. Specifically, chart 910 illustrates the effect of moving either the optical coupler or the optical source in the x direction such that the respective center axes are no longer aligned for the two different optical sources. Moreover, for each optical source, the misalignment in the z direction was varied when $\Delta y = \Delta z = 0$ and when $\Delta y = \Delta z = 0.3$ microns.

Figure 9D:
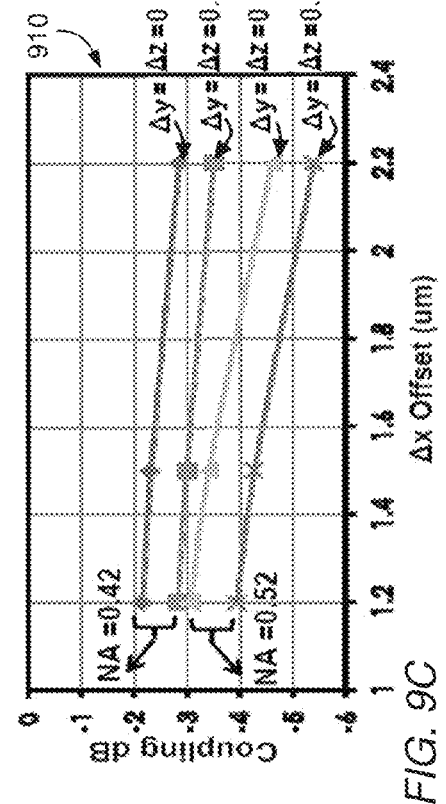

Chart 915 of FIG. 9D illustrates the effect of misalignment on the optical system 800 in FIG. 8 using the same parameters used in chart 910 of FIG. 9C. As seen by comparing the charts 910 and 915, the optical system 800 when using the NA=0.42 source (which corresponds to the lines with diamonds and squares) is slightly more intolerant to misalignment in the x direction when $\Delta y = \Delta z = 0$. Moreover, when $\Delta y = \Delta z = 0.3$ microns, the optical system 800 has, in general, better coupling efficiency than the second optical system.

The optical system 800 when using the NA=0.52 source (which corresponds to the lines with triangles and Xs) is more tolerant to misalignment in the x direction when $\Delta y = \Delta z = 0$ and when $\Delta y = \Delta z = 0.3$ microns than the second optical system. Further still, the optical system 800 overall exhibits a better coupling efficiency than the second optical system with a NA=0.52 optical source.

Thus, as shown by charts 900, 905, 910, 915, an optical system with a dual tip coupler is more tolerant to misalignments that may occur during the alignment process or after the optical system has been installed—e.g., when an impact force causes the optical source and the optical coupler to misalign. Furthermore, these charts illustrate the advantage of using the dual tip coupler rather than a single, tapered coupler for improving the overall coupling efficiency with an optical source.

Reducing Back Reflections

In addition to being less tolerant to misalignment, the second optical system referred to in FIGS. 9A-9D experiences back reflection when an optical signal from an optical source is introduced at the optical interface. Much of this back reflection is caused by the fact that the tip of the first portion is directly in line with the peak of the laser field—i.e., the center axes of the first portion and the center axis of the optical source are the same. Note that the back reflections into the optical source resulting from the optical interface itself, which might be caused due to index discontinuities, can be eliminated by angling the optical interface in accordance with Snell's law and is well known to those proficient in the art of optical design. However, the back reflections arising from the tip of the first portion cannot be eliminated by angling the optical interface. Many applications in photonics require that the back reflected power into the laser cavity is very low since these reflections can destabilize the laser resulting in mode hops or abrupt changes in power output. As such, when using the second optical system, an optical isolator is placed between the laser and the optical coupler to suppress the back reflections into the laser cavity. However, doing so makes the optical system more complex and increases the cost of the optical package.

The optical system 800 in FIG. 8, however, may experience less back reflection than the second optical system. As shown in FIG. 8, the peak of the laser field outputted by the optical source 805 which corresponds to the alignment axis 810 does not intersect the first portion 305 or the second portion 310. Instead, the optical source 805 is aligned so that its peak is between the two portions 305, 310. As a result, optical system 800 may result in back reflections that have a lesser affect on the optical source 805 (e.g., less likely to mode hop or fewer power fluctuations). In some embodiments, the optical isolator may be omitted from the system 800 which means substantial cost savings relative to using the second optical system where the isolator may be necessary. Moreover, in one embodiment, to further reduce the harmful effects of back reflection, the first and second portions 305, 310 may be offset or staggered which is illustrated in FIGS. 10A-10B.

Figure 10A:
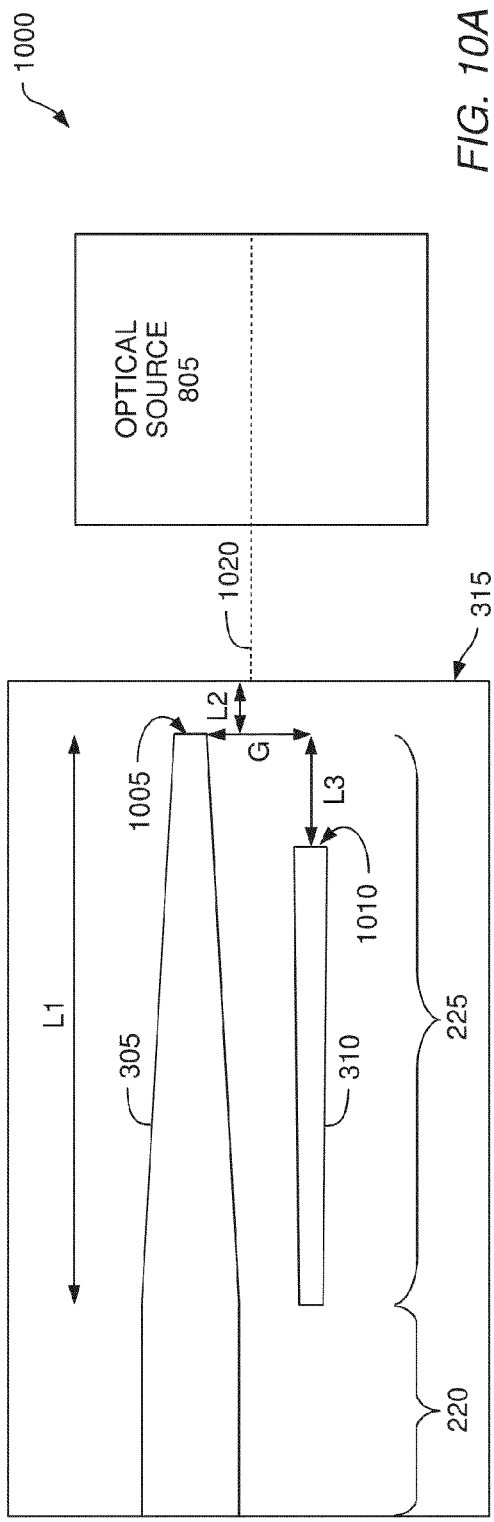
FIGS. 10A-10B illustrate optical couplers with offset components, according to embodiments disclosed herein.
Figure 10B:
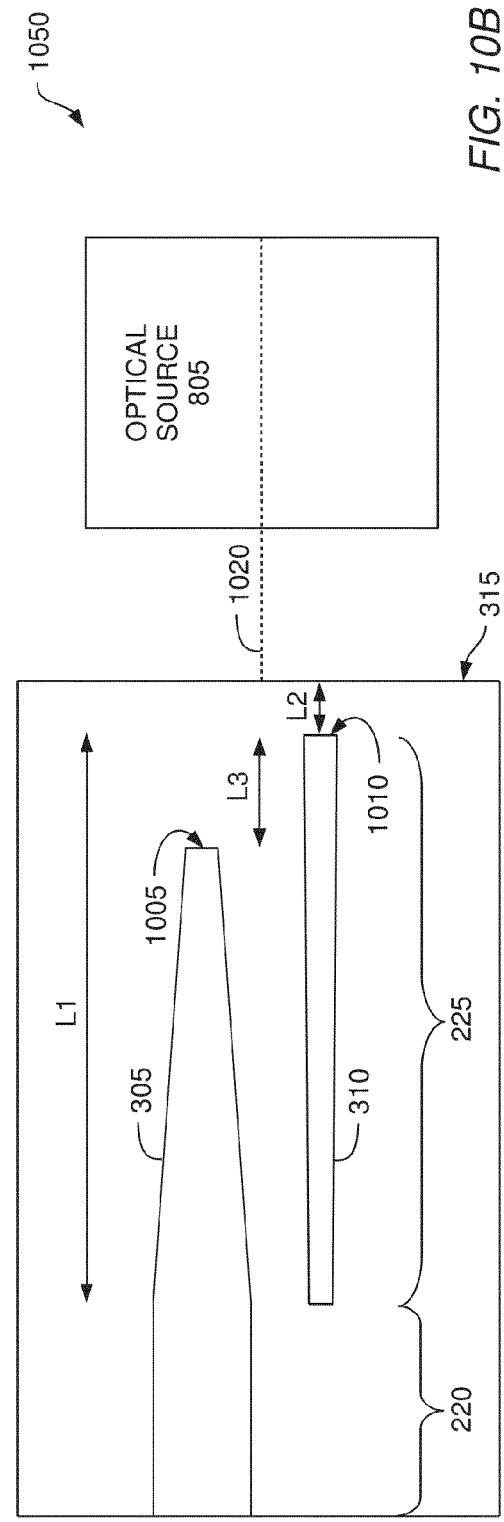

FIGS. 10A-10B illustrate optical couplers with first and second portions arranged to reduce the harmful effects of back reflections, according to embodiments disclosed herein. As shown, the tips of the first and second portions facing the optical interface 315 are staggered or offset. That is, instead of the tips being equidistant from the optical interface 315, one of the portions is closer to the optical interface 315 than the other. That is, the respective distances between the first and second portions 305, 310 and the optical interface 315 are unequal. In the optical system 1000 in FIG. 10A, the tip 1005 of the first portion 305 is closer to the optical interface 315 than the tip 1010 of the second portion 310 by a length L3. In one embodiment, the value of L3 is less than 1 micron. In another embodiment, the value of L3 is less than 200 nm or less than 100 nm.

Moreover, a center axis 1020 of the optical source 805, which may be the center axis 1020 of a laser cavity in the optical source 805, is aligned with the optical coupler 225 such that it lies between the tip 1005 of the first portion 305 and the tip 1010 of the second portion 1010. In one embodiment, the center axis 1020 intersects the middle of a gap G separating the two tips 1005, 1010. As such, the peak of the laser field, which may correspond to the center axis 1020, does not lie directly in front of either the tip 1005 or the tip 1010.

The optical system 1050 in FIG. 10B is similar to FIG. 10A except that tip 1005 of the first portion 305 is recessed further from the optical interface 315 than tip 1010 of the second portion 310. Either way, by staggering the tips of the first and second portions 305, 310, the effect of the back reflections on the optical source 805 may be mitigated relative to using an optical system where the peak of the laser field is aligned with the first portion 305.

Figure 11A:
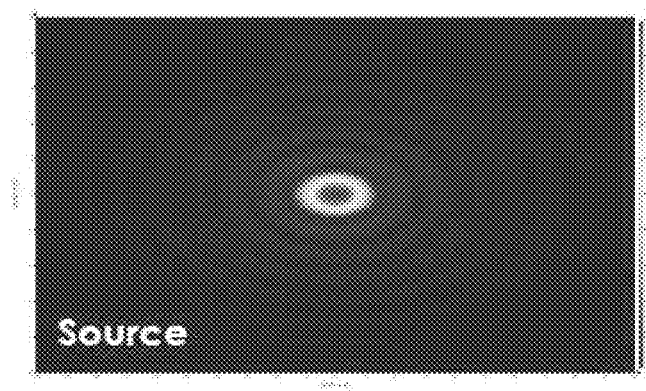
FIGS. 11A-11E illustrate back reflection profiles corresponding to optical couplers with offset components, according to embodiments disclosed herein.

FIGS. 11A-11E illustrate back reflection field profiles corresponding to optical couplers where the tips of the first and second portions are offset, according to embodiments disclosed herein. Specifically, FIGS. 11B-11E illustrate the optical field of the back reflections as the value of L3 shown in FIGS. 10A-10B is incremented. FIG. 11A illustrates the optical field of the original signal that is transmitted from the optical source 805 into the optical coupler 225, while FIGS. 11B-11E illustrate the optical field of the back reflections corresponding to a different L3 value.

Figure 11B:
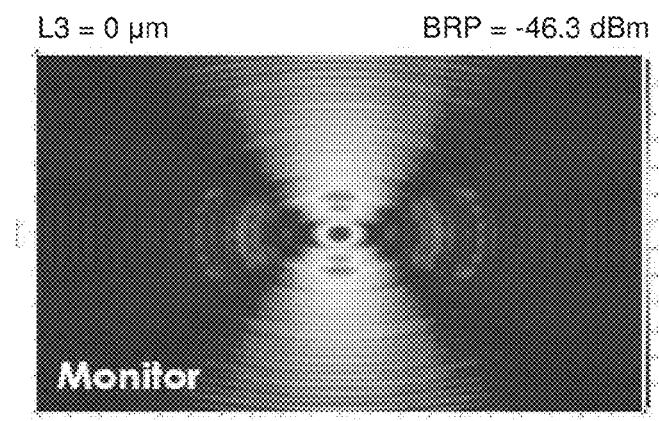

FIG. 11B illustrates the optical field of the back reflections when L3=0 microns—i.e., when the tips of the first and second portions are not offset or staggered as shown in FIG. 8. In this case, the back-reflected power (BRP) at the optical source is −46.3 dBm. In contrast, if the optical source was aligned with the center axis of the first portion, the BRP can be greater than −45 dBm (e.g., −44.5 dBm). Thus, using the optical system 800 where the tips of the first portion 305 and second portion 310 are not staggered reduces the BRP relative to aligning the peak of the laser field directly to the first portion 305.

Figure 11C:
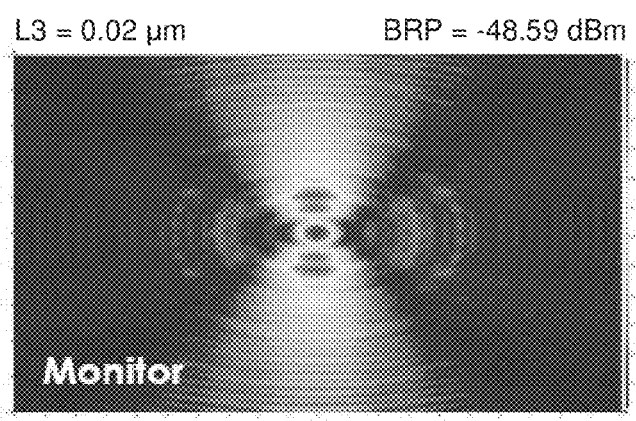

FIG. 11C illustrates the optical field of the back reflections when L3=0.02 microns. Generally, by increasing the offset L3, the shape of the field of the back reflections is changed such that it differs from the mode of the source 805. The greater the difference in the optical modes, the smaller the BRP at the optical source and the smaller the effect of the back reflections on the optical source. Thus, because of the change between the optical modes in FIGS. 11B and 11C, the BRP is further reduced to −48.59 dBm.

Figure 11D:
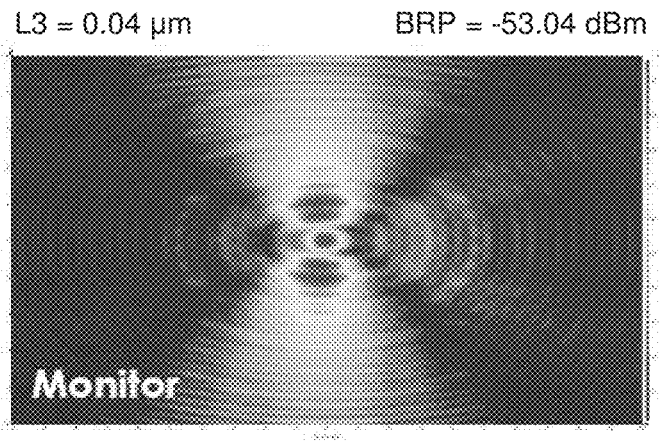

FIG. 11D illustrates the optical field of the back reflections when L3=0.04 microns. Because the difference in the shapes of the optical mode of the back reflection and the mode of the source in increased, the BRP at the optical source is further reduced to −53.04 dBm. Thus, for optical sources that require at least a BRP less than −50 dBm, using L3−0.04 microns means that an optical isolator may be omitted. Stated differently, the optical system with L3=0.04 microns would not need to include an optical isolator between the optical source and the optical interface to ensure the BRP is less than −50 dBm.

Figure 11E:
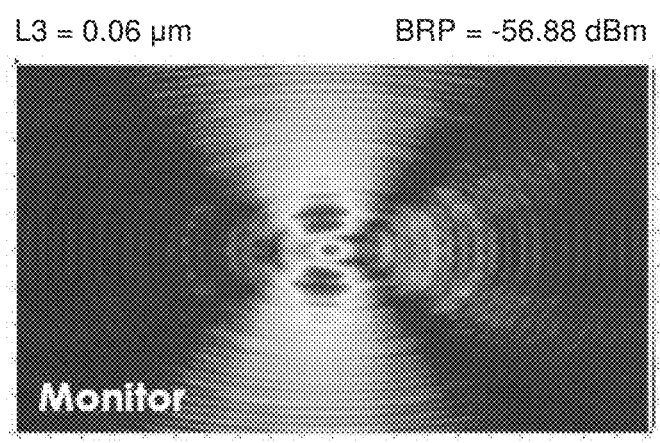

FIG. 11E illustrates the optical field of the back reflections when L3=0.06 microns. With this value, the BRP is further reduced to −56.88 dBm. To obtain the simulation results shown in FIGS. 11B-11E, the values of the optical system where W1=180 nm, W2=450 nm, W3=180 nm, W4=130 nm, L1=43.2 microns, G1 was approximately 0.6+/−0.1 microns, and L2=1 micron.

Figure 12:
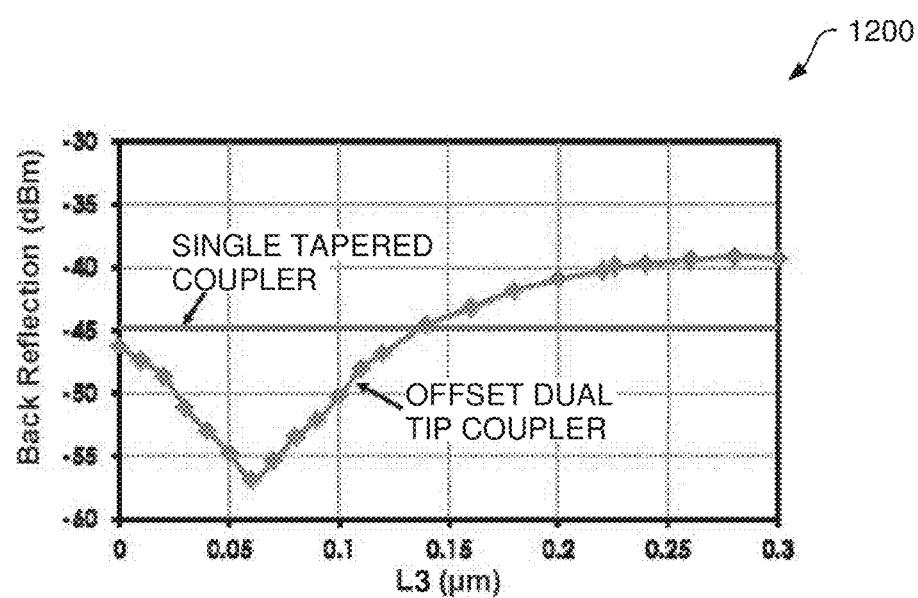
FIG. 12 is a graph of back reflection power, according to one embodiment described herein.

FIG. 12 illustrates a graph 1200 of the BRP based on the offset L3, according to one embodiment described herein. The graph 1200 illustrates varying the offset L3 in the dual tip coupler 225 shown in FIG. 10A between 0-0.3 microns. Specifically, it illustrates that the greatest attenuation of the BRP is achieved around 0.06-0.07 microns—which corresponds to the optical mode shown in FIG. 11E. A similar response as the one shown in this graph 1200 is expected if the coupler 225 illustrated in FIG. 10B is used instead—i.e., where the tip of the second portion is closer to the optical interface than the tip of the first portion. For ease of comparison, graph 1200 also includes the BRP measured when a single tapered coupler is used—i.e., the optical coupler described above that only includes the first portion. Note that the dimensions of the optical coupler used to derive chart 1200 where the same as the dimension used to simulate the optical modes shown in FIGS. 11B-11E.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality and operation of possible implementations of systems or methods. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

We claim:

1. An optical device, comprising:
    an optical interface;
    a waveguide; and
    an optical coupler coupled to the waveguide configured to at least one of transmit and receive an optical signal across the optical interface, the optical coupler comprising:
        a first portion comprising a first end attached to the waveguide and a second end, opposite the first end, facing the optical interface, and
        a second portion extending in a direction away from the waveguide and towards the optical interface, the second portion comprising a third end facing the optical interface, and wherein an entirety of the second portion is separated by a gap from both the first portion and the waveguide,
    wherein the second end of the first portion is offset a first distance from the optical interface and the third end of the second portion is offset a second distance from the optical interface, wherein the first and second distances differ by at most 1 micron.

2. The optical device of claim 1, wherein a width of the first portion tapers as the first portion extends from the first end to the second end.

3. The optical device of claim 1, wherein the first and second distances range from 0 microns to 6 microns.

4. The optical device of claim 3, wherein the first and second distances are unequal.

5. The optical device of claim 1, wherein the waveguide contains a fourth end and a fifth end, wherein the fourth end is connected to an optical component in the optical device and the fifth end is connected to the first portion of the optical coupler.

6. The optical device of claim 1, wherein the gap is filled with a dielectric material.

7. The optical device of claim 1, wherein the second portion comprises a fourth end opposite the third end, wherein the second portion tapers as the second portion extends from the third end to the fourth end.

8. The optical device of claim 1, wherein the first portion and the second portion extend in a common direction towards the optical interface.

9. An optical system comprising:
a light-carrying medium; and
an optical device aligned with the light-carrying medium at an optical interface, the optical device comprising:
a waveguide, and
an optical coupler comprising:
a first portion comprising a first end attached to the waveguide and a second end, opposite the first end, facing the optical interface, and
a second portion extending in a direction away from the waveguide and towards the optical interface, wherein an entirety of the second portion is separated by a gap from both the first portion and the waveguide,
wherein a center axis of the light-carrying medium intersects a region between the first and second portions.

10. The optical system of claim 9, wherein the light-carrying medium is one of a core of an optical fiber and a cavity of a laser.

11. The optical system of claim 9, wherein the light-carrying medium and optical device are aligned such that a peak of an optical signal transmitted from the light-carrying medium to the optical coupler is incident on the region between the first and second portions.

12. The optical system of claim 11, wherein the region is directly between respective tips of the first and second portions facing the optical interface.

13. The optical system of claim 9, wherein the second portion comprises a third end facing the optical interface, wherein the second end of the first portion is offset a first distance from the optical interface and the third end of the second portion is offset a second distance from the optical interface, wherein the first and second distances differ by at most 1 micron.

14. The optical system of claim 13, wherein the first and second distances are unequal.

15. An optical device comprising:
an optical interface;
a waveguide connected to an optical component at a first end; and
an optical coupler connected to a second end of the waveguide configured to at least one of transmit and receive an optical signal across the optical interface, the optical coupler consisting of:
a first portion comprising a third end attached to the second end of the waveguide and a fourth end, opposite the third end, facing the optical interface, wherein a width of the first portion tapers as the first portion extends from the third end to the fourth end, and
a second portion extending in a direction away from the waveguide and towards the optical interface, wherein an entirety of the second portion is separated from both the first portion and the waveguide.

16. The optical device of claim 15, wherein the second portion comprises a fifth end facing the optical interface, wherein the fourth end of the first portion is offset a first distance from the optical interface and the fifth end of the second portion is offset a second distance from the optical interface, wherein the first and second distances differ by at most 1 micron.

17. The optical device of claim 16, wherein the first and second distances are unequal.

18. The optical device of claim 15, wherein the first portion and the second portion extend in a common direction towards the optical interface.

19. The optical device of claim 15, wherein the second portion comprises a fifth end facing the optical interface and a sixth end opposite the fifth end, wherein the second portion tapers as the second portion extends from the sixth end to the fifth end.

20. The optical device of claim 15, wherein the material of the optical coupler and the waveguide comprises silicon.

* * * * *